(12) United States Patent
Trammel et al.

(10) Patent No.: US 9,038,138 B2
(45) Date of Patent: May 19, 2015

(54) DEVICE TOKEN PROTOCOL FOR AUTHORIZATION AND PERSISTENT AUTHENTICATION SHARED ACROSS APPLICATIONS

(75) Inventors: John Trammel, Seattle, WA (US); Andrei Kalfas, Bucharest (RO); Lutfiye Umit Yalcinalp, San Francisco, CA (US); Daniel Carl Brotsky, Berkeley, CA (US); James Thomas Boag, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 230 days.

(21) Appl. No.: 13/609,018

(22) Filed: Sep. 10, 2012

(65) Prior Publication Data

US 2014/0075513 A1   Mar. 13, 2014

(51) Int. Cl.
*H04L 29/06* (2006.01)
*G06F 21/41* (2013.01)

(52) U.S. Cl.
CPC ............ *G06F 21/41* (2013.01); *H04L 63/0807* (2013.01)

(58) Field of Classification Search
CPC .................... H04L 63/0876; H04L 9/3213
USPC ............................................................ 726/4
See application file for complete search history.

(56) References Cited

U.S. PATENT DOCUMENTS 8,473,749 B1 *  6/2013   Madsen et al. ................ 713/187

\* cited by examiner

*Primary Examiner* — Longbit Chai
(74) *Attorney, Agent, or Firm* — Kilpatrick Townsend & Stockton LLP

(57) ABSTRACT

Various techniques for providing a device token protocol for authorization and persistent authentication shared across applications are disclosed. In some embodiments, a device token protocol for authorization and persistent authentication shared across applications includes sending user credentials to a remote server to authenticate a user on a device for a plurality of applications; and receiving a device token from the remote server for the user to authenticate the user for the plurality of applications on the device, in which the device token facilitates authentication and authorization.

14 Claims, 10 Drawing Sheets

FIG. 3

Sign In

You must Sign in with an Adobe ID.

Adobe ID (Email Address)

402

Password

404

Your credentials will be stored on this device.

Trouble signing in?

Create an Adobe ID

Cancel    Sign In

FIG. 4

502 — Hello Andrei Kalfas, do you want to authorize ▓▓▓▓▓ to access your account data?
☑ Persist data on Mac No    Yes

DEVICE TOKEN PROTOCOL FOR AUTHORIZATION AND PERSISTENT AUTHENTICATION SHARED ACROSS APPLICATIONS

BACKGROUND OF THE INVENTION

Various authentication techniques exist. Authentication generally refers to verifying an identity of a person (e.g., user) or software program. Authentication techniques generally include using authentication credentials to verify an identity of a person or software program.

Various authorization techniques also exist. Authorization generally refers to sharing of private resources with other persons (e.g., users) or software programs. Authorization techniques generally include identifying access rights of a person or software program to certain shared private resources.

BRIEF DESCRIPTION OF THE DRAWINGS

Various embodiments of the invention are disclosed in the following detailed description and the accompanying drawings.

FIG. 3 is a screen shot for implementing a device token protocol for authorization and persistent authentication shared across applications in accordance with some embodiments.

FIG. 4 is another screen shot for implementing a device token protocol for authorization and persistent authentication shared across applications in accordance with some embodiments.

FIG. 5 is another screen shot for implementing a device token protocol for authorization and persistent authentication shared across applications in accordance with some embodiments.

DETAILED DESCRIPTION

Figure 1:
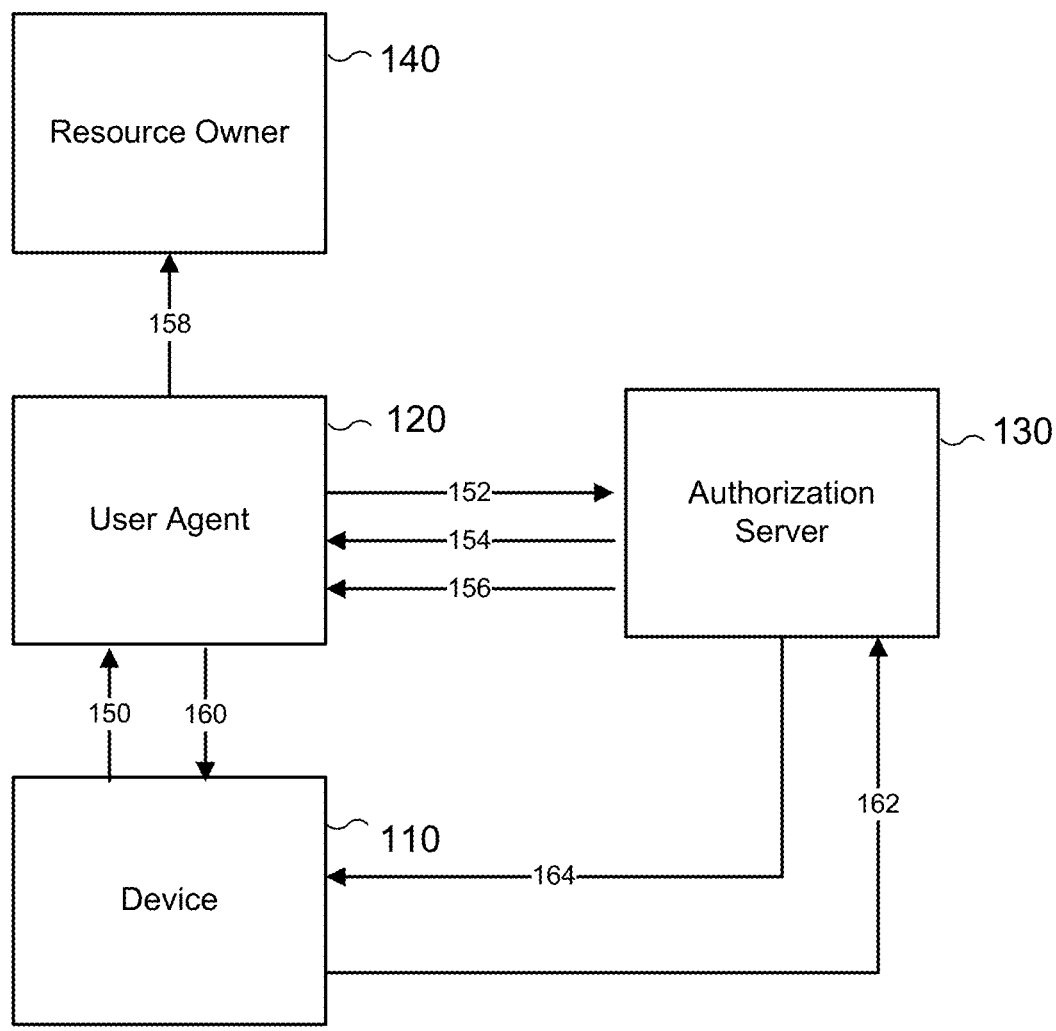
FIG. 1 is a functional block diagram illustrating a device token protocol for authorization and persistent authentication shared across applications in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Software clients and applications are available on heterogeneous devices, including, for example, tablets, smart phones, desktop computers, and lap top computers. For example, in mobile applications, each application typically embodies access control for the user that is configured separately. As new applications are added, access for the user is configured for the application. User's credentials are typically stored on the device via encryption rather than identifying the device and authorizations of the specific user for the device.

In particular, the practice of using stored user credentials for authentication and authorization is a common approach. Examples include email applications from different vendors on a device on which user credentials for each email application are stored; Twitter account settings that require storage of user credentials on the device, and various other examples. Thus, these approaches require user credentials to be stored on the device on a per application basis.

However, when there are multiple applications from the same vendor, this approach can become cumbersome and error prone. While the user is governed by a centralized identity service, the security on the device is only achieved by replicating the user credentials on the device on a per application basis.

Without a centralized mechanism on the client (e.g., client device or device), a management problem can also occur, for example, when the user, in a heterogeneous landscape, needs to access more devices and/or applications. Approaches towards using centralized account management at a single source in the client device, however, still require storing the user's credentials on the client device in a centralized location. As a result, existing approaches fail to provide sufficient security and remote management needed for today's applications. For example, mobile devices can be broken, stolen, compromised, or lost and, thus, mechanisms for facilitating remote management of all the authorizations for the user to reduce security risk are needed. Further, a specific company can decide to terminate access for a user and it is important to be able to securely and reliably disable access to all of the applications on a device from a centralized server.

Various authentication techniques exist. Authentication generally refers to verifying an identity of a person (e.g., user) or software program. Authentication techniques generally include using authentication credentials to verify an identity of a person or software program.

For example, OpenID is an open standard protocol for authentication. OpenID is generally an open standard that describes how users can be authenticated in a decentralized (e.g., federated) manner. A decentralized or federated authentication approach can eliminate the need for services to provide their own authentication system. This decentralized or federated authentication approach also allows users to consolidate their digital identities (e.g., by reusing the same authentication credentials for different services). As an example, users can create accounts with one or more preferred OpenID identity providers (e.g., Google, Yahoo, Verisign, or others), and then use those accounts as a basis for signing onto any service (e.g., web site or other service) that accepts OpenID authentication.

However, authentication techniques typically store the associated authentication credentials locally on a device. This approach exposes the authentication credentials to potential security vulnerabilities, because the authentication credentials stored locally on the device are at risk of tampering and/or unauthorized use or access.

Various authorization techniques also exist. Authorization generally refers to sharing of private resources with other persons (e.g., users) or software programs. Authorization techniques generally include identifying access rights of a person or software program to certain shared private resources.

For example, the OAuth protocol (e.g., OAuth Version 2.0) is an open standard protocol for authorization. The OAuth protocol generally allows users to share their private resources (e.g. photos, videos, contact lists, and/or other private resources) stored on one site with another site without having to share their credentials, typically supplying username and password tokens instead. The OAuth protocol has become increasingly popular to grant access to clients of services (e.g., web services or web sites). Each token grants access to a specific site (e.g., a video editing site) for specific resources (e.g., just videos from a specific album) and for a defined duration (e.g., the next 2 hours). As an example, OAuth can be used to allow a user to grant a third party site access to their information stored with another service provider (e.g., to share access to the user's Facebook friends and/or LinkedIn connections), without sharing their access permissions or the full extent of their data.

However, authorization techniques typically use tokens that are not persistent (e.g., OAuth tokens are per instance or session-based tokens, or tokens can be subject to other time limitations, such as time-out or expiration parameters). Existing authorization techniques also typically use username and password tokens, but do not use device tokens that associate a particular user and a particular device. Such authorization techniques also do not provide tokens that can be used for authorization by a user for multiple different applications on a particular device.

What is needed are techniques for facilitating multiple applications (e.g., a set of applications from the same vendor or source, such as an application suite) to be accessed by a user on a specific device securely and in a user friendly manner, without requiring separate user authentication for each application hosted on the specific device.

Accordingly, various embodiments for a device token protocol for authorization and persistent authentication shared across applications are disclosed. In some embodiments, a device token protocol is disclosed that provides for securely persisting authentication for a user for use by a set of authorized applications on a device (e.g., laptop computer, desktop computer, mobile phone, tablet, etc.) using a device token. In particular, the device token is uniquely associated with a specific device and user. The device token can be used by one or many authorized applications. In some embodiments, the device token is persistent, but the device token is nontransferable (e.g., the device token cannot be transferred to another device or to another user).

In some embodiments, this mechanism for a device token protocol for authorization and persistent authentication shared across applications is secure (e.g., by making a device token only usable by the device and the user it was issued for).

In some embodiments, this mechanism for a device token protocol for authorization and persistent authentication shared across applications does not require the persistence of user credentials on the device. For example, this approach provides for enhanced security as user credentials are not stored on the device, and the device token cannot be used on other devices, or by other users on the same device. Rather, using various techniques described herein, device identities can be managed by a centralized server (e.g., cloud service) to enable increased security and management capabilities for a set of applications on the device.

In some embodiments, this mechanism for a device token protocol for authorization and persistent authentication shared across applications enables remote revocation of authorizations (e.g., outside of the presence of the device, such that if the device is lost, stolen, or compromised, then the device token can be remotely deauthorized/revoked). For example, providing such a mechanism for permanent and revocable authentication generally does not require that a user re-authenticate and re-authorize on a per client basis (e.g., per application executed on a device). Depending on the security policy, re-authentication and reauthorization may be required. For example, a change of login credentials of the user at the backend authorization service can require reauthorization of the device token. As another example, a change of terms of use of a service can require re-authentication of the user to verify the terms of use. In some embodiments, similar policies are implemented.

In some embodiments, this mechanism for a device token protocol for authorization and persistent authentication shared across applications is remotely configurable (e.g., allows for server side control over what client applications can make use of the mechanism). For example, such a mechanism can enhance scalability of deployment by facilitating incremental deployment of multiple applications to a device, as device tokens can authorize an increasing number of applications from a single source without the need for re-authentication by the user. Also, such a mechanism supports remote management as the device tokens can be remotely revocable, which facilitates managing of all devices that are permitted to access (e.g., execute) specific applications for a specific user using a centralized server to remotely configure the device tokens associated with that specific user and those devices for that specific user.

In some embodiments, this mechanism for a device token protocol for authorization and persistent authentication shared across applications facilitates a unified authorization and authentication experience for users. For example, such a mechanism can provide a single, common way of handling authentication for multiple different applications (e.g., a set of applications, which can be part of an application suite from a vendor or group of vendors).

In some embodiments, a device token protocol for authorization and persistent authentication shared across applications is implemented as an open protocol. For example, a device token protocol for authorization and persistent authentication shared across applications can be implemented as an extension(s) to the OAuth protocol and OpenID-Connect protocol (e.g., as a new grant type). Specifically, as described herein, a new grant type can be defined to facilitate the device token protocol for authorization and persistent authentication shared across applications.

In some embodiments, a device token protocol for authorization and persistent authentication shared across applications is implemented as a proprietary protocol. For example, a device token protocol for authorization and persistent authentication shared across applications can be implemented as a proprietary protocol to meet specific needs of a set of applications and services of a particular vendor (e.g., to provide for authorization and persistent authentication shared across a suite of applications from a particular vendor, such as Adobe Systems Inc., or another software vendor). For example, this mechanism can be applied for using a single application as well as a collection of applications.

For example, using the various techniques described herein, a device token protocol for authorization and persistent authentication shared across applications can provide for a securely persisting authentication for a user for use by a set of authorized applications on a device (e.g., laptop computer, desktop computer, mobile phone, tablet, etc.) using a device token. The device token can be uniquely associated with the specific device and user. The device token can be used by one or many applications. The device token can be persisted (e.g., as opposed to persistently storing the user's login credentials on the device), but it is non-transferable (e.g., the device token cannot be transferred to another device or to another user, because the device token is uniquely associated with both the device and the user). In this manner, the persistently stored device token on the device can be used to re-authenticate the user on the device for an increasing number of resources (e.g., additional applications and/or other resources).

In some embodiments, a device token protocol for authorization and persistent authentication shared across applications includes sending user credentials to a remote server to authenticate a user on a device for a plurality of applications; and receiving a device token from the remote server for the user to authenticate the user for the plurality of applications on the device, in which the device token is a persistent device token for securely persisting authentication and authorization of the user for each of the plurality of applications on the device. In some embodiments, the device token is a persistent device token (e.g., stored in persistent storage without an expiration). In some embodiments, the device token is a persistent, non-transferable device token, in which the device token is uniquely associated with the user and with the device. In some embodiments, the device token includes authorization information to authorize the user on the device to access a resource. In some embodiments, the device token is associated with a device identifier (ID) that is uniquely associated with the device, in which the device token is associated with a user identifier (ID). In some embodiments, the device token includes an authentication token. In some embodiments, the device token is bound to a specific device and user and can be used to create an access token(s) for authorized client applications on that device. In some embodiments, the user authorization credentials are not stored locally on the device.

In some embodiments, a device token protocol for authorization and persistent authentication shared across applications further includes sending an access token request to the remote server, in which the access token request includes the device token and a client identifier, and in which the client identifier uniquely identifies a client application; and receiving an access token from the remote server, in which the access token grants access to the client application.

In some embodiments, a device token protocol for authorization and persistent authentication shared across applications further includes receiving a deauthorization message from the remote server, in which the deauthorization message invalidates the device token.

In some embodiments, a device token protocol for authorization and persistent authentication shared across applications further includes executing an application manager that communicates with the plurality of applications on the device to implement the device token based authentication and authorization, in which the device token is uniquely associated with a user identifier and a device identifier to verify authentication, and in which the device identifier is associated with a profile identifier to provide for the authorization for access to a resource.

FIG. 1 is a functional block diagram illustrating a device token protocol for authorization and persistent authentication shared across applications in accordance with some embodiments. As shown, a device 110 communicates with a user agent 120. For example, a user agent can be an application manager, which can be implemented as integrated with an application or suite of applications, as a library or an agent that calls a library (e.g., an Adobe Identity Management Server (IMS) client library) that can be called by the application or suite of applications or user agent, and/or using a web browser to redirect requests for authentication and authorization using the techniques described herein. As also shown, the user agent 120 communicates (e.g., via a network, such as the Internet) with an authorization server 130 (e.g., an authorization server can include an Adobe IMS authorization server). The user agent 120 is also in communication with a resource owner 140 (e.g., a server or set of services and/or an application or set of applications, such as an application suite, for example, Adobe® Creative Suite®, Adobe® Creative Cloud®, or another application suite from Adobe or another software vendor).

In some embodiments, a new grant type, referred to as a device token, is provided (e.g., to implement a proprietary protocol or to extend an open protocol). For example, the grant type can be similar to an authorization grant type, except that while the authorization code is bound to a specific client identifier (ID), the device token is bound to a specific device as well as to a specific user. Thus, this approach can be used to create access tokens for authorized clients on the same device for specific applications. The device grant type can be effectively used for client applications on devices (e.g., such as natively executed applications). In some embodiments, the client application must adhere to specific requirements in the system, such as the following: (a) client applications must be specifically authorized to use the device token grant type and be configured in advance of deployment; (b) client applications must share secure access to and generation characteristics for the device identifier (ID); (c) client applications must generate the device ID via an algorithm (e.g., SHA-256 or another hash function or other algorithm can be used), shared by the coordinating applications, each time the application launches or intends to use the device token; and (d) client applications do not persist the device ID in its final form (e.g., the device ID is not persistently stored locally on the device).

In some embodiments, a platform refers to code specific for the platform (e.g., Apple MAC, Apple iOS, Google Android, Microsoft Windows, and Linux). In some embodiments, a user identifier is used to identify users on devices that allow multiple users, where there is a need to limit device token portability between users on the same device. In some embodiments, a profile identifier is used for devices that allow multiple users, where there is a need or desire to limit device token portability between groups/profiles on the same device. In some embodiments, a device identifier (ID) is used to uniquely identify the specific device (e.g., a device ID can be generated using an OS or system specific value, such as a unique serial number or other unique hardware identifier).

Referring to FIG. 1, as shown at 150 and 152, the device 110 initiates the protocol flow by directing a request to the user agent 120 for the resource owner 140 (e.g., a client application that executes locally on the device 110), and the user agent 120 sends the request (e.g., authentication/authorization request) to a device authorization endpoint, which is shown as the Authorization Server 130. In some embodiments, the request that is sent to the authorization server 130 includes various information, including, for example, a device identifier, a client identifier (e.g., for uniquely identifying a client application), a requested scope, geographical information (e.g., local/state information), and a redirection uniform resource identifier (URI) to which the authorization server will send the user agent back once access is granted.

As shown at 154 and 158, the authorization server 130 authenticates the resource owner 140 via the user agent 120. In some embodiments, the user is provided with an option to choose whether or not to persist data on the device. If the user elects to persist data on the device, then the authorization server 130 generates a device token for sending to the device 110 via the user agent 120. Otherwise, then the authorization server 130 generates an authorization code, which is not persistent (e.g., can only be used for a given session and is not persistently stored on the device), for sending to the device 110 via the user agent 120 (e.g., a user may elect to not persist data on the device if the user is attempting to access a resource from a device that is not their own device, such as from a publicly accessible device).

If the authentication is successful, then at 156, the authorization server 130 redirects the user agent 120 back to the device 110 using the redirection URI provided earlier. In some embodiments, depending on a user input, the redirection URI includes a device token or an authorization code (e.g., and can also include any geography related information previously provided and/or various other information, such as a profile identifier or other information).

At 162, the device 110 requests an access token from the authorization server's token endpoint by authenticating using the client credentials (e.g., device ID) and a device token or an authorization code (e.g., an access token request can include the device token or an authorization code, which can be securely transmitted using a secure protocol and/or the device token (or authorization code) can be encrypted or obfuscated). The authorization server 130 then attempts to validate the client credentials (e.g., device ID) and the device token or the authorization code. If the authorization server 130 successfully validates the request, then the authorization server 130 responds back to the device 110 with an access token as shown at 164. As discussed above, the user's input regarding consent for persisting data on the device determines whether the device token would be used subsequently for authentication instead of the authorization code. In some embodiments, the authorization code is only valid once and cannot be persisted (e.g., the authorization code is on a per-instance or per-session basis).

In some embodiments, each client application is associated with a unique identifier, such as a client identifier (ID) (e.g., client_id). For example, this unique identifier can be provided at time of configuration of the application prior to deployment so that the authorization server 130 at run time can uniquely identify the client application with its client ID. In addition to securely transmitting each client's request, each client can be configured with a client secret by the authorization server 130 at a time of registration.

In some embodiments, a user authenticated using this protocol is associated with a profile, such that the protocol can also transmit additional parameters that are specified for the user using a scope. For example, the OpenID protocol can be specified to obtain such specific parameters.

In some embodiments, device tokens are persisted (e.g., persistently stored on the device in non-volatile storage), such that the device tokens are persistent device tokens. For example, different approaches for persisting device tokens can be implemented. As a first implementation example, a client can choose to store the device token in a client specific storage (e.g., persistently stored on the device in non-volatile storage), akin to storing user credentials today, storing the device token in application and user specific credential storage (e.g. using secured storage, such as using a Mac OS X keyChain). This approach can work particularly well with individual applications. As a second implementation example, a separate user agent, such as an application manager (e.g., using an account management library) is provided that manages device tokens and related authentication tokens for multiple applications (e.g., various different applications and/or application suites associated with a vendor(s)). The application manager can be responsible for storing the device token(s) on behalf of the user as well as generating authentication tokens for specific applications that need authentication and authorization. This approach allows multiple applications to use the same mechanism on the device for implementing the protocol as described herein in accordance with various embodiments. This approach also decouples the applications from security and persistence issues, while providing for the benefits of security and manageability.

In some embodiments, a device token is encrypted or obfuscated. In some embodiments, an authorization code is encrypted or obfuscated.

In some embodiments, a client constructs a request URI by adding the following parameters to the query component of the authorization endpoint URI using the "application/x-www-form-urlencoded" format as shown further below. Below is an example list of parameters, whether or not such are required, and a description of the parameters.

| Parameter | Mandatory | Description |
| --- | --- | --- |
| response_type | true | Must be device |
| device_id | true | SHA-256 on the device ID - up to clients to generate and provide the device ID. |
| device_name | false | If specified can be used to present to the user a user-friendly name of the device. |
| redirect_uri | false | If missing, the server will use the default redirect URI that is provisioned during the registration phase of a client. |
| client_id | true | The client identifier. This client identifier is provided for the application during the registration phase. |

| Parameter | Mandatory | Description |
| --- | --- | --- |
| scope | true | The scope of the access request expressed as a list of comma-delimited, case sensitive strings. |
| locale | false | The locale to be used, in UI, supplied in the format language_country. Default is en_US. |
| state | false | State related parameter. |
| dc | false | If set to "true" the account creation button will be disabled. Otherwise if set to "false" or not present the create account button will be enabled. |

An example device token request is shown below.

```
/ims/authorize/v1?client_id=AXX_YYY&response_type=device&&-
device_id=MA4Y2fwV1av8soWHoOnmubOiFWhXOgnwePp9dExqU&-
device_name=
Mac&redirect_uri=http%3A%2F%2Fstophere.adobe.com&-
scope=openid HTTP/1.1
Host: ims-host.adobelogin.com
```

An example device token response with a device token is shown below.

```
HTTP/1.1 302 Moved Temporarily
Server: Apache-Coyote/1.1
Set-Cookie: relay=0526317f-3e77-46c1-8b19-957a06a9b2e8; Path=/
Cache-Control: no-store
P3P: CP="IDC DSP COR CURa ADMa OUR IND PHY ONL COM
STA"
X-RHH: B8E1750B964EE62AB7C147F0EDF12803
Location:
http://stophere.adobe.com?device_token=
eyJhbGciOiJSUzI1NiJ9.eyJpZCI6Ijk5NTkx
XXXXXXXXXXXXXXXXXXXXXXXXXXXXXXXXXXXXX
XXXXXXXXXXXXXXXXXXXXXXXXXXXXXXXXXXXXX
XXXXXXXXXXXXXXXXXXXXXXXXXXXXXXXXXXXXX
1L9l8-
2MrKPezjNhyN7_7YaX9aJ0lz0Iu1w0Hg7Q_vY3BZS8ui4ZdCCnlpCg
Content-Type: text/html;charset=UTF-8
Content-Language: en-US
Transfer-Encoding: chunked
Content-Encoding: gzip
Vary: Accept-Encoding
Date: Mon, 14 Nov 2011 12:50:01 GMT
```

An example device token response with an authorization code is shown below.

```
HTTP/1.1 302 Moved Temporarily
Server: Apache-Coyote/1.1
Set-Cookie: relay=08da1a84-9179-4720-95c5-c871fdc69063; Path=/
Cache-Control: no-store
P3P: CP="IDC DSP COR CURa ADMa OUR IND PHY ONL COM
STA"
X-RHH: B8E1750B964EE62AB7C147F0EDF12803
Location:
http://stophere.adobe.com?code=
eyJhbGciOiJSUzI1NiJ9.eyJpZCI6ImI3MzAzYjliLWE
XXXXXXXXXXXXXXXXXXXXXXXXXXXXXXXXXXXXX
XXXXXXXXXXXXXXXXXXXXXXXXXXXXXXXXXXXXX
XXXXXXXXXXXXXXXXXXXXXXXXXXXXXXXXXXXXX
XXX
QTAxNzEzRDk5MjBGQUFFQEFkb2JlSUQiLCJjbGllbnRfaWQiOiJBQ-
U1fQ1M2In0.WuiC-taSzHZr64_R8UxWPIaJfMlP_ZebI0dach-
JoQvRCtovhdF207YPemyu-
XXXXXXXXXXXXXXXXXXXXXXXXXXXXXXXXXXXXX
XXXXXXXXXXXXXXXXXXXXXX
DLUranknrIFciR8UvhSz8-Cghj0L5zht-
9R4cvO_CSAZFeEsyG6riK4invdMPlPPEa6GK9uhOY-
b0SQUxj4vA6ER6qXBwftjNKRntCxO
XPcf4zOkuEGTZNoI_IA0oqqxRp
XXXXXXXXXXXXXXXXXXXXXXXXXXXXXXXXXXXXX
XXXXXXXXXXXXXXXXXXXX
o_mUbr69_P2CceEb0veYfQ
Content-Type: text/html;charset=UTF-8
Content-Language: en-US
Transfer-Encoding: chunked
Content-Encoding: gzip
Vary: Accept-Encoding
Date: Mon, 14 Nov 2011 12:50:14 GMT
```

In some embodiments, depending on the user's consent (e.g., whether or not to persist credentials on the device), the server issues a device token and sends the device token to the client by adding the following parameter(s) to the query component of the redirection URI using the "application/x-www-form-urlencoded" format, as shown below.

| Parameter | Mandatory | Description |
| --- | --- | --- |
| device_token | true | The device token bound to the device. |
| state | false | If present in the device token request |

If the user did not agree for persisting data on the device IMS will fall back to releasing an authorization code and the query component of the redirection URI using the "application/x-www-form-urlencoded" format will include the following, as shown below.

| Parameter | Mandatory | Description |
| --- | --- | --- |
| code | true | The authorization code. |
| state | false | If present in the device token request |

In some embodiments, an example access token request with a device token is generated and sent to a token endpoint by adding the following parameter(s) using the "application/x-www-form-urlencoded" format in the HTTP request entity body, as shown below.

| Parameter | Mandatory | Description |
| --- | --- | --- |
| grant_type | true | Must be device |
| device_id | true | SHA-256 on the device ID - up to clients to generate and present the device ID. |
| device_token | true | The device token received at the previous step. |
| client_id | true | The client_id credential received during the registration phase. |
| client_secret | true | The client_secret credential received during the registration phase. |

An example access token request with a device token is shown below.

```
POST /ims/token/v1 HTTP/1.1
User-Agent: curl/7.21.4 (universal-apple-darwin11.0) libcurl/7.21.4
OpenSSL/0.9.8r zlib/1.2.5
Host: ims-host.adobelogin.com
Accept: */*
```

-continued

```
Content-Length: 740
Content-Type: application/x-www-form-urlencoded
grant_type=device&device_id=
MA4Y2KfwV1av8soWHoOnmubOiFWhXOgnwePp9dExqU&
device_token=
eyJhbGciOiJSUzI1NiJ9.eyJpZCI6Ijk5NTkxMzFjLWRjNXXXXX
XXXXXXXXXXXXXXXXXXXXXXXXXXXXXXXXXXXXXXXX
XXXXXXXXXXXXXXXXXXXXXXXXXXXXXXXXXXXXXXXX
XXXXXXXXXXXXXXXXXXXXXXXXXXXXXXXXXXXXXXXX
XXXXXXXXXXXXXXXXXXXXXXXXXXXXXXXXXXXXXXXX
XXXXXXXXXXXXXXXXXXXXXXXXXXXXXXXXXXXXXXXX
XXXXXXXXXXXXXXXXXXXXXXXXXXXXXXXXXXXXXXXX
XXXXXXXXXXXXXXXXXXXXXXXXXXXXXXXXXXXXXXXX
XXXXXXXXXXXXXXXX6KIS289f8LykG1G4aKbgUHaUyJKLK
yFZeMxueMY4GRAU1DVFl2u54oaSsxffytZX3wV29edW5RPZbHgRjP-
0aCmHzakMjXmuGGSlFNl1l2MjKAnM4ckUin2Nj6I7xeV6IrSbeGTY1-
b4KAkrZmyPuX9O71L9l8-2MrKPezjNhyN7__7YaX9aJ0lz0Iu1w0Hg7-
Q__vY3BZS8ui4ZdCCnlpCg&client_id=<
YOUR_CLIENT_ID>&client_secret=<YOUR_CLIENT_SECRET>
```

An example access token response is shown below.

```
HTTP/1.1 200 OK
Server: Apache-Coyote/1.1
Set-Cookie: relay=0c122e22-58be-4c5d-b215-d362b9142c71; Path=/
Cache-Control: no-store
P3P: CP="IDC DSP COR CURa ADMa OUR IND PHY ONL COM STA"
X-RHH: B8E1750B964EE62AB7C147F0EDF12803
Content-Type: application/json;charset=UTF-8
Transfer-Encoding: chunked
Date: Mon, 14 Nov 2011 13:17:56 GMT
{"token_type":"bearer","expires_in":86399952,"refresh_token":"eyJhbGciOUSUzI1Ni
J9.eyJpZCI6IjU4N2I1NzI0LTY3NGEtNGVlNS04OGE0LWE5NDc2NTNhNjRiYiIsImNyZ
XXXXXXXXXXXXXXXXXXXXXXXXXXXXXXXXXXXXXXXXXXX
XXXXXXXXXXXXXXXXXXXXXXXXXXXXXXXXXXXXXXXXXXX
XXXXXXXXXXXXXXXXXXXXXXXXXXXXXXXXXXXXXXXXXXX
XXXXXXXXXXXXXXXXXXXXXXXXXXXXXXXXXXXXXXXXXXX
XXXXXXXXXXXXXXXXXXXXXXXXXXXXXXXXXXXX
3189Izk1lqqeLeNFnp_0O43uzK7jgSvTSs3DoOh4iU7HF6eVEeJ1YGFYsbd1VaGsiCIhp
xxs0ZsDj2jQGs-
XXXXXXXXXXXXXXXXXXXXXXXXXXXXXXXXXXXXXXXXXXX
XXXXXXXXX
Ur5-gnf5NVgkv0lftoGdtGZWV7xJJVlYXfMAYUwy7l_XSQA2FPGhzYh4L52kgpnkV3y64X
LWnwG2qGc91Fn9LWLqnCg","access_token":"eyJhbGciOiJSUzI1NiJ9.eyJpZCI6ImJlODU5Z
mE5LWZhYWQtNGUxYi1iZDkxLWIwNGFhMTBlZjY3NiIsI
XXXXXXXXXXXXXXXXXXXXXXXXXXXXXXXXXXXXXXXXXXX
XXXXXXXXXXXXXXXXXXXXXXXXXXXXXXXXXXXXXXXXXXX
XXXXXXXXXXXXXXXXXX
pZW50X2lkIjoiQUFNX0NTNiJ9.UVRT8F9Npwse7VpZ4FKcrQ2HYZo2pJapqqFMBid8iMonx
5XW4Aifyky064Kxybw1IqnZa36wi4_3Ewpvbqb6exbycSk-z9jlfuNZdeJhCCkjoEITp6Puft_
DpZnwIz8KqntoU4FQQsqOE27y2q7ZWdbrwkNd2RbUhF7-
XXXXXXXXXXXXXXXXXXXXXXXXXXXXXXXXXXXXXXXXXXX
XXXXXXXXXXXXXXXXXXXXXXXXXXXXXXXXXXXXXXXXXXX
XXXXXXXXXXXXXXXXX
WPLPOwIWIwvX__gW1xui1WIvjUbzVelkqF0Td2jMwiig"}
```

In some embodiments, the server (e.g., an authorization server) issues an access token and a refresh token, and constructs the response by adding the following parameters to the entire body of the HTTP response with a 200 (OK) status code.

| Parameter | Mandatory | Description |
| --- | --- | --- |
| access_token | true | The access token |
| refresh_token | true | The refresh token |
| expires_in | true | The duration in milliseconds of the access token lifetime. For example, the value "360000" denotes that the access token will expire in one hour from the time the response was generated. |

In some embodiments, in addition to the above parameters, the server adds in the response attributes from the user's profile based on the requested scope at the Device Token Request. For example, the parameters can be included in the entity body of the HTTP response using the appropriate media type (e.g., "application/json" media type will serialize the parameters into a JSON structure).

In some embodiments, the client (e.g., device) makes a request to the token endpoint by adding the following parameter(s) using the "application/x-www-form-urlencoded" format in the HTTP request entity-body, as shown below.

| Parameter | Mandatory | Description |
| --- | --- | --- |
| grant_type | true | Must be authorization_code |
| code | true | The authorization code previously received |
| client_id | true | The client_id credential received during the registration phase. |

-continued

| Parameter | Mandatory | Description |
| --- | --- | --- |
| client_secret | true | The client_secret credential received during the registration phase. |

In some embodiments, the server (e.g., authorization server) validates the client credentials (e.g., device ID) and ensures that the authorization code was issued to the client. For example, the authorization code may be used only once, but the device token can be stored and reused to grant access.

For example, with an authorization code, a client (e.g., device) can request an access token. An example access token request with an authorization code is shown below.

```
POST /ims/token/v1 HTTP/1.1
Host: ims-na1-dev1.adobelogin.com
Content-Type: application/x-www-form-urlencoded
grant_type=authorization_code&client_id=
THE_CLIENT_ID&client_secret=THE_CLIENT_SECRET&code=
eyJhbGciOiJSUzI1NiJ9.
XXXXXXXXXXXXXXXXXXXXXXXXXXXXXXXXXXXXXXXXX
XXXXXXXXXXXXXXXXXXXXXXXXXXXXXXXXXXXXXXXXX
XXXXXXXXXXXXXXXXXXXXXXXXXXXXXXXXXXXXXXXXX
XXXXXXXXXXXXXXXXXXXXXXXXXXXXXXXXXXXXXXXXX
XXXXXXXXXXXXXXXXXXXXX
Dhfl4DoMYg77zwRreCXXXXXXXXXXXXXXXXXXXXXXXXXXX
XXXXXXXXXXXXXXXXXXXXXXXXXXXXXXXXX
pCKYQ
ptre4G7X6ZNappSeZrrn7n9E2k9upl2x8hfh1_XEvtraQSZYthf6S1Xxz8k-
E3_F6a06FrSXLwqSmNGv03pg4LUQdMcozT2cD1qrCDUxigWRiVKC-
CeKKguQV_aRJ3jT1Cy1w_
XXXXXXXXXXXXXXXXXXXXXXXXXXXXXXXXXXXXXXXXXXX
XXXXXXXXXXXXXXXXXXXXXX
e7wM4pdXQg
```

In some embodiments, the server (e.g., authorization server, such as IMS) checks the client credentials (e.g., device ID) and the authorization code, and if the client credentials and authorization code are verified, the server sends back a response, such as shown below.

```
HTTP/1.1 200 OK
Date: Tue, 09 Aug 2011 12:54:15 GMT
Server: Apache-Coyote/1.1
X-Powered-By: Servlet 2.5; JBoss-5.0/JBossWeb-2.1
Cache-Control: no-store
P3P: CP="IDC DSP COR CURa ADMa OUR IND PHY ONL COM STA"
X-RHH: 97435077DFCC6F3C7E96C9FC040F7ADA
Content-Type: application/json;charset=UTF-8
Set-Cookie: relay=3822af13-1bc7-441d-85a1-97034c8c3e91; Path=/
Transfer-Encoding: chunked
{"token_type":"bearer","expires_in":86399945,"refresh_token":"eyJhbGciOiJSUzI1Ni
J9.eyJpZCI6ImNiMjMwMzJiLTFkMjEtNDc0Zi05MmU0LTZmNjM2MDk0ZjE1YiIsImN
XXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXX
XXXXXXXXXXXXXXXXXX
6v2lYBOMp0q3mkFhGrRe3gisd6ADnLlaRKAFkzhfmaK2yOPBMvfSQ2aAayihm_
61UI-JsyUO3TZ9xLXxkf27yDzEtQfZpwLgZd2iNdTwKvLZlaG7wHO4hiSVfopAfRXXXXXX
XXXXXXXXXXXXXXXXXXXXXXXXXXXXXXXXXXXXXXXXXXXXXXXXXXXXX
XXX
RQ-ToPRi4KW-_HsBMgFZVgegnS7IP0i4i4cTwZdcaZHxMhtPn21WILRQOVYuSeGmCDOQ
YWhgn684uUjj9I-9lWOnylWSxlseVorvfEecc0XxNYX2_Xbb4WBg","access_token":"eyJhbGc
iOiJSUzI1NiJ
9.eyJpZCI6ImY0NzY1OWRlLTM0ZGYtNGMwZS04ODVmLWRhZGNlNTMxZGFhNyIsI
XXXXXXXXXXXXXXXXXXXXXXXXXXXXXXXXXXXXXXXXXXXXXXXXXXXXX
XXXXXXXXX
AwIiwidXNlcl9pZCI6Im1vbml0b3JAQWRvYmVJRCJ9.QdHPuBndEqAts-
JPHiYRF299VReaqg-L4jSNVNna5prwOzWDdTx4cQXy3e4J3EXu98hcc5vA_PKVjMjXYnhx
aigI320r36Nyo4Z
XXXXXXXXXXXXXXXXXXXXXXXXXXXXXXXXXXXXXXXXXXXXXXXXXXXXX
XXXXXXXXX
XXXXXXXXXXXXXXXXXXXXXXXXXXXXXXXXXXXXXXXXXXXXXXXXXXXXX
XXXXXXXXX
RtAlq3UnlwC1fxHX8aTqd4mRjDiXnmKNM4j4Hp8pUV-G3CvgP8x3182XQAC_j7_-
wLDy55eavizJ5T3Upja7oKtFgaXfXnfHI3A9B8uG1g"}
```

In some embodiments, the server (e.g., authorization server, such as IMS) issues an access token and a refresh token, and constructs the response by adding the following parameter(s) to the entire body of the HTTP response with a 200 (OK) status code, as shown below.

| Parameter | Mandatory | Description |
| --- | --- | --- |
| access_token | true | The access token. |
| refresh_token | true | The refresh token. |
| expires_in | true | The duration in milliseconds of the access token lifetime. For example, the value "360000" denotes that the Access token will expire in one hour from the time the response was generated. |

In some embodiments, in addition to the above parameters, the server may add in the response attributes from the user's profile based on the requested scope at the Device Token Request. For example, the parameters can be included in the entity body of the HTTP response using the specific media-type, such as "application/json" which will serialize the parameters into a JSON structure.

Figure 2:
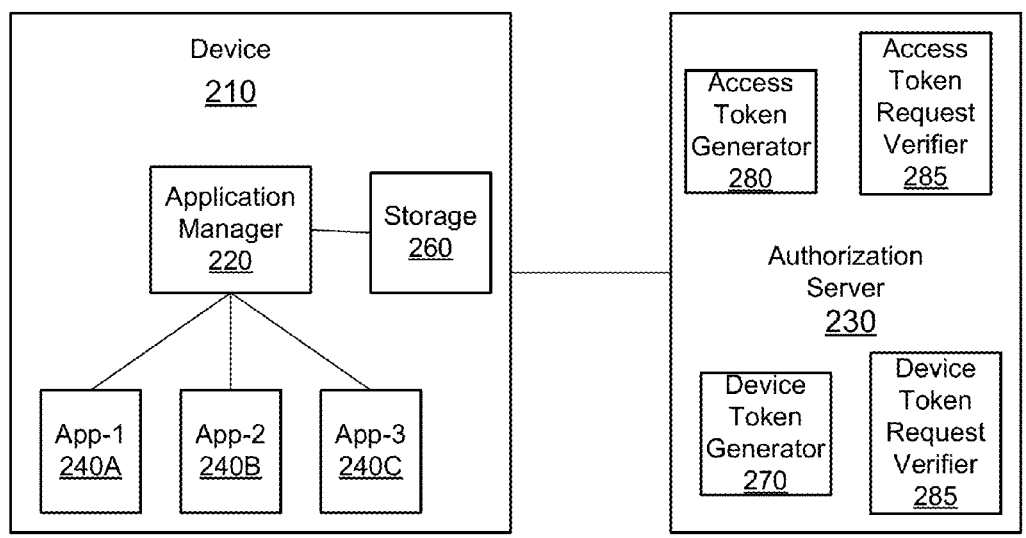
FIG. 2 is another functional block diagram illustrating a device token protocol for authorization and persistent authentication shared across applications in accordance with some embodiments.

FIG. 2 is another functional block diagram illustrating a device token protocol for authorization and persistent authentication shared across applications in accordance with some embodiments. As shown, a device 210 includes an application manager 220 (e.g., implemented as a user agent executed on a processor of the device 210, which can be implemented as integrated with an application or suite of applications, as a library or an agent that calls a library, such as an Adobe Intelligent Media Server (IMS) client library, that can be called by the application or suite of applications or user agent, and/or using a web browser to redirect requests for authentication and authorization using the techniques described herein). As also shown, the application manager 220 communicates (e.g., via a network, such as the Internet) with an authorization server 230 (e.g., an authorization server can include an Adobe IMS authorization server). In some embodiments, the user agent 220 is in secure communication with the authorization server (e.g., using a secure communication protocol, such as HTTPS, SSL, and/or other secure communication protocols). The application manager 220 is also in communication (e.g., locally on the device) with a set of resources, including Application-1 240A, Application-2 240-B, and Application-3 240-C (e.g., a set of applications, which can be from a different vendors, or form a specific vendor, such as an application suite, for example, Adobe® Creative Suite®, Adobe® Creative Cloud®, or another application suite from Adobe or another software vendor). In some embodiments, the application manager 220 implements the device token protocol for authorization and persistent authentication shared across applications as described herein with respect to various embodiments. As also shown, device 210 includes a storage 260 (e.g., non-volatile storage) for storing a device token(s), such as a persistent device token(s) as described herein with respect to various embodiments. Storage 260 can also store an authorization code(s), which can also be stored in volatile memory, as described herein with respect to various embodiments.

As also shown in FIG. 2, authorization server 230 includes a device token generator 270 for generating device tokens after a device token request is verified using a device token request verifier 275. In some embodiments, the device token generator 270 (e.g., or another function/module) generates authorization codes as described herein. As also shown, authorization server 230 includes an access token generator 280 for generating access tokens after an access token request is verified using an access token request verifier 275.

In some embodiments, a device token protocol for authorization and persistent authentication shared across applications supports requiring a re-verification of device tokens by users (e.g., in various contexts, such as user credential changes, licensing or terms of use changes, or other configurable or administrative desired situations). For example, users can be required to perform a re-verification of device tokens when users change their login credentials to the authorization service (e.g., user A logs in from device D and uses a few applications using a device token for authorized access to those applications; user A then changes their login password to the authorization service; the user can be prompted to login again using their new password to access the same application(s) on device D before user A can continue to use the device token). As another example, re-verification of device tokens can be required if a user seeks access to a new service that has different terms of service or different associated policies (e.g., a heightened security policy).

FIG. 3 is a screen shot for implementing a device token protocol for authorization and persistent authentication shared across applications in accordance with some embodiments. In some embodiments, a user interface is provided for a user to enter user credentials and/or other information for requesting access to a resource (e.g., to a set of applications and/or other resources). In some embodiments, the user interface is implemented by a user agent, such as an application manager, and/or using a browser. As shown in FIG. 3, a graphical user interface (GUI) for a login page includes fields for a user to enter user credentials at 302 (e.g., in this example, to enter the user's Adobe ID credentials, shown as fields for input of an Adobe ID (Email Address) and password, for accessing a group of Adobe applications). As shown at 304, an opt-in field is also provided for receiving a user input for whether or not the user wants to store credentials on this device. If the user selects this field (e.g., checks the checkbox at 404 of this graphical user interface (GUI), or in some cases, the checkbox is checked by default), then after a successful authentication and authorization process is completed, a device token can be persistently stored on the device, as described herein with respect to various embodiments.

FIG. 4 is another screen shot for implementing a device token protocol for authorization and persistent authentication shared across applications in accordance with some embodiments. As shown in FIG. 4, a graphical user interface (GUI) for a login page includes fields for a user to enter user credentials at 402 (e.g., in this example, to enter the user's Adobe ID credentials for accessing a group of Adobe applications). However, in some cases users are not allowed to opt out, such as in this example, and thus, an opt-in field is not provided for receiving a user input for whether or not the user wants to store credentials on this device. Rather, as shown at 404, a default selection is indicated in which the credentials will be stored on the device is indicated, such that after a successful authentication and authorization process is completed, a device token can be persistently stored on the device, as described herein with respect to various embodiments.

FIG. 5 is another screen shot for implementing a device token protocol for authorization and persistent authentication shared across applications in accordance with some embodiments. In some embodiments, an interstitial page for requesting user consent about storing data on the device is provided, such as shown in FIG. 5. For example, this approach can be provided for other identity providers (e.g., Google, Yahoo, Facebook, Twitter, Microsoft, and/or others) for which the login page for those identity providers is not altered to include such an opt-in field. In particular, at 502, a graphical user interface (GUI) for an interstitial page includes an opt-in field for receiving a user input for whether or not the user wants to store credentials on this device. If the user selects this field (e.g., checks the checkbox at 502 of this graphical user interface (GUI), or in some cases, the checkbox is checked by default), then after a successful authentication and authorization process is completed, a device token can be persistently stored on the device, as described herein with respect to various embodiments.

Figure 6:
FIG. 6 is another screen shot for implementing a device token protocol for authorization and persistent authentication shared across applications in accordance with some embodiments.

FIG. 6 is another screen shot for implementing a device token protocol for authorization and persistent authentication shared across applications in accordance with some embodiments. As similarly discussed above with respect to FIG. 4, in some cases users are not permitted to opt out, such as in this example, and thus, an opt-in field is not provided for receiving a user input for whether or not the user wants to store credentials on this device. Rather, as shown at 602, a graphical user interface (GUI) for an interstitial page indicates a default selection in which the credentials will be stored on the device is indicated, such that after a successful authentication and authorization process is completed, a device token can be persistently stored on the device, as described herein with respect to various embodiments.

Figure 7:
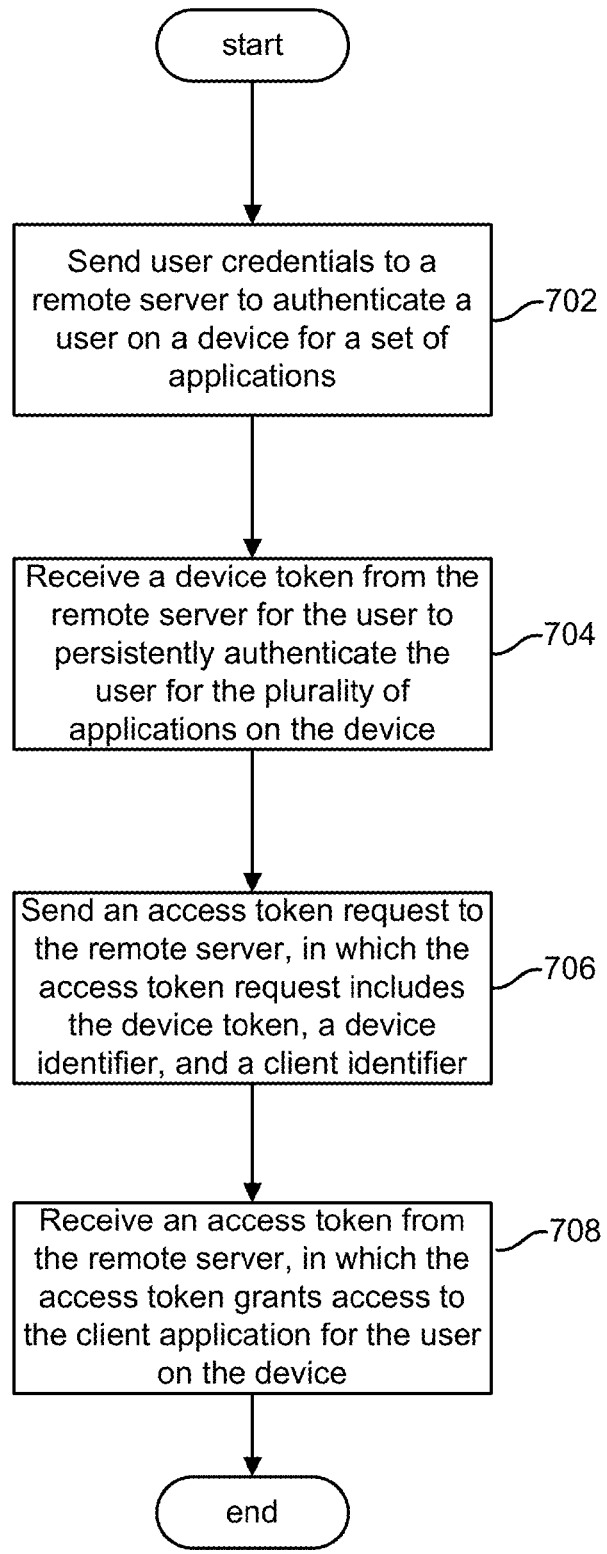
FIG. 7 is a flow diagram illustrating a device token protocol for authorization and persistent authentication shared across applications in accordance with some embodiments.

FIG. 7 is a flow diagram illustrating a device token protocol for authorization and persistent authentication shared across applications in accordance with some embodiments. At 702, sending user credentials to a remote server to authenticate a user on a device for a plurality of applications is performed. At 704, receiving a device token from the remote server for the user to persistently authenticate the user for the plurality of applications on the device is performed, in which the device token facilitates authentication and authorization. In some embodiments, a persistent device token is received (e.g., as opposed to an authorization code that is not stored persistently and can only be used on a per-instance or per-session basis), and the device token is persistently and securely stored on the device. At 706, sending an access token request to the remote server is performed, in which the access token request includes the device token, a device identifier (e.g., which uniquely identifies the device), and a client identifier (e.g., which uniquely identifies a client application on the device, and in which the client application is one of the plurality of applications). At 708, an access token is received from the remote server, after the remote server verifies the access token request (e.g., verifying the device token and the device identifier to determine that the requested access to the client application associated with the client identifier can be authorized), in which the access token grants access to the client application for the user on the device.

Figure 8:
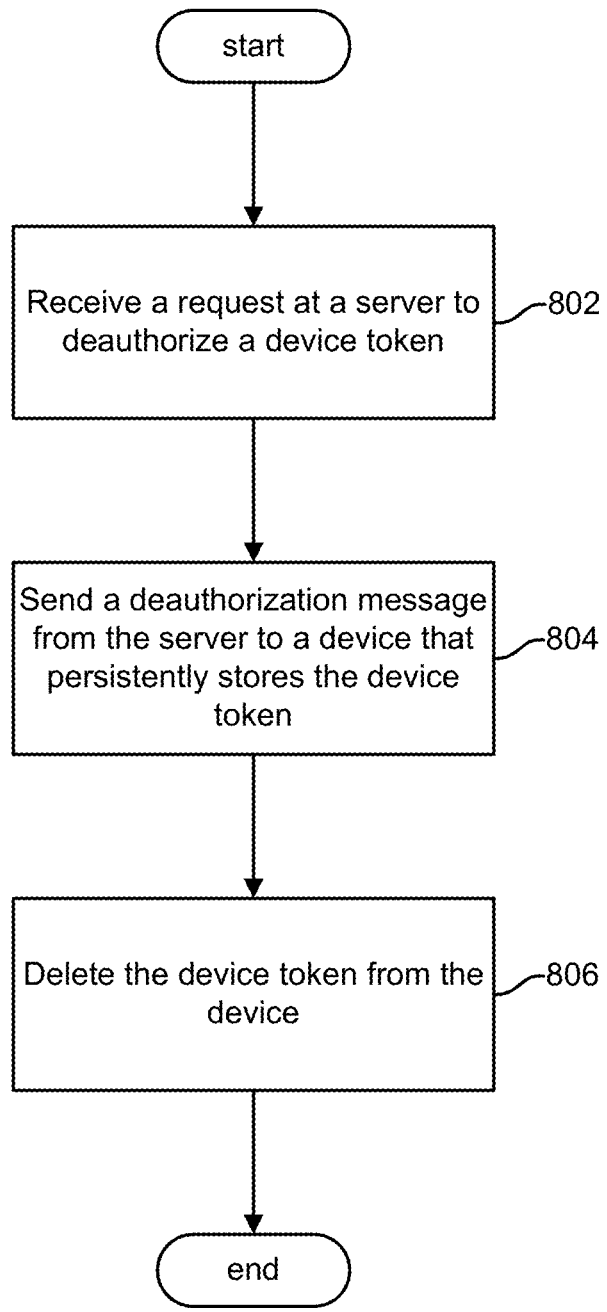
FIG. 8 is another flow diagram illustrating a device token protocol for authorization and persistent authentication shared across applications in accordance with some embodiments.

FIG. 8 is another flow diagram illustrating a device token protocol for authorization and persistent authentication shared across applications in accordance with some embodiments. At 802, receiving a request at a server (e.g., an authentication server) to deauthorize a device token is performed. At 804, sending a deauthorization message from the server to a device that persistently stores the device token is performed. At 806, deleting the device token from the device is performed.

Figure 9:
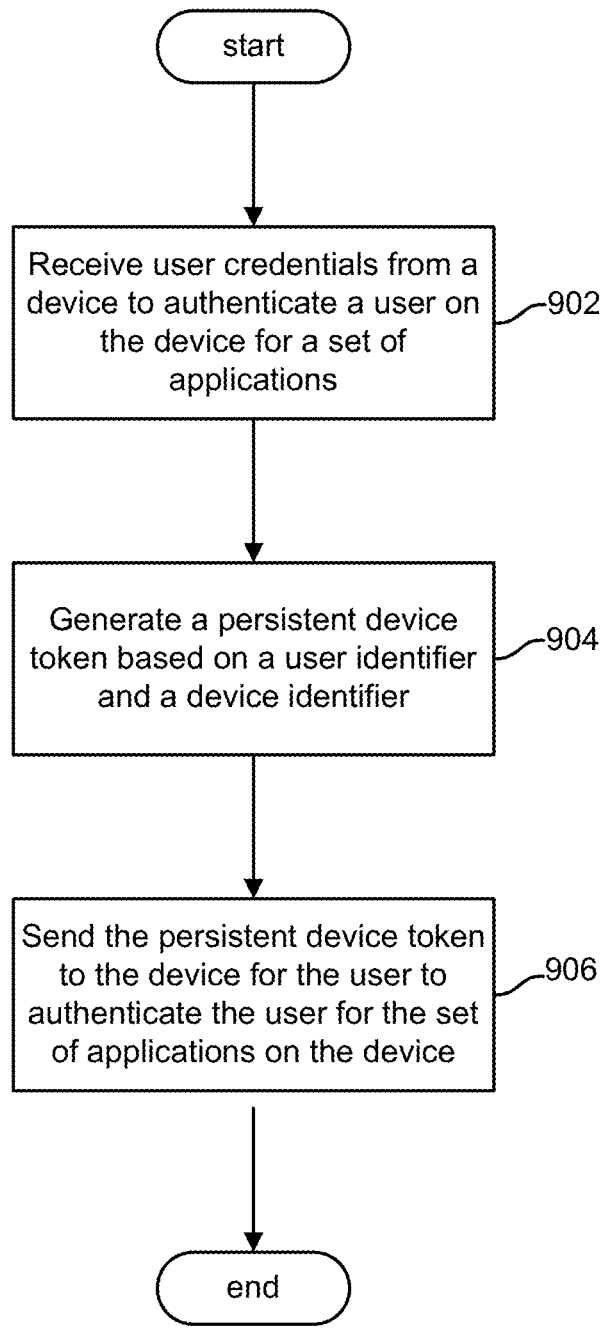
FIG. 9 is another flow diagram illustrating a device token protocol for authorization and persistent authentication shared across applications in accordance with some embodiments.

FIG. 9 is another flow diagram illustrating a device token protocol for authorization and persistent authentication shared across applications in accordance with some embodiments. At 902, receiving user credentials from a device to authenticate a user on the device for a set of applications is performed. At 904, generating a persistent device token based on a user identifier and a device identifier is performed, in which the persistent device identifier is uniquely associated with the user and the device. At 906, sending the persistent device token to the device for the user to authenticate the user for the set of applications on the device is performed.

Figure 10:
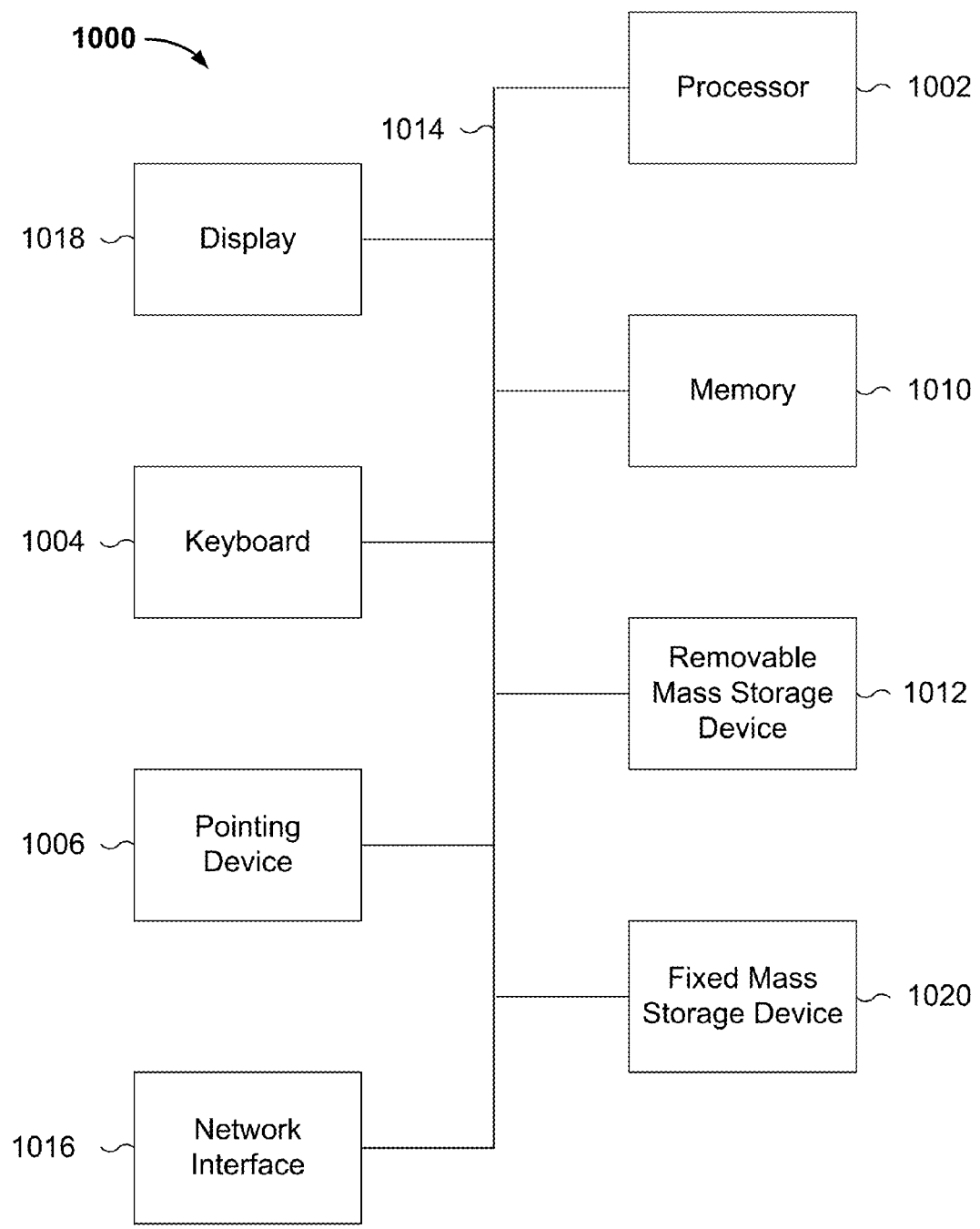
FIG. 10 is a functional diagram illustrating a programmed computer system for a device token protocol for authorization and persistent authentication shared across applications in accordance with some embodiments.

FIG. 10 is a functional diagram illustrating a programmed computer system for a device token protocol for authorization and persistent authentication shared across applications in accordance with some embodiments. As shown, FIG. 10 provides a functional diagram of a general purpose computer system programmed to perform a device token protocol for authorization and persistent authentication shared across applications in accordance with some embodiments. As will be apparent, other computer system architectures and configurations can be used to perform a device token protocol for authorization and persistent authentication shared across applications. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018). In some embodiments, processor 1002 includes and/or is used to provide the various computer/computer implemented functional elements described herein with respect to FIGS. 1-6 and/or executes/performs the process(es) described herein with respect to FIGS. 7-9.

Processor 1002 is coupled bidirectionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as well known in the art, primary storage typically includes basic operating instructions, program code, data and objects used by the processor 1002 to perform its functions (e.g., programmed instructions). For example, primary storage devices 1010 can include any suitable non-transitory computer readable storage media, described below, depending on whether, for example, data access needs to be bidirectional or unidirectional. For example, processor 1002 can also directly and very rapidly retrieve and store frequently needed data in a cache memory (not shown).

A removable mass storage device 1012 provides additional data storage capacity for the computer system 1000, and is coupled either bidirectionally (read/write) or unidirectionally (read only) to processor 1002. For example, storage 1012 can also include computer-readable media such as magnetic tape, flash memory, PC cards, portable mass storage devices, holographic storage devices, and other storage devices. A fixed mass storage 1020 can also, for example, provide additional data storage capacity. The most common example of mass storage 1020 is a hard disk drive. Mass storage 1012, 1020 generally store additional programming instructions, data, and the like that typically are not in active use by the processor 1002. It will be appreciated that the information retained within mass storage 1012, 1020 can be incorporated, if needed, in standard fashion as part of primary storage 1010 (e.g., RAM) as virtual memory.

In addition to providing processor 1002 access to storage subsystems, bus 1014 can be used to provide access to other subsystems and devices as well. As shown, these can include a display monitor 1018, a network interface 1016, a keyboard 1004, and a pointing device 1006, as well as an auxiliary input/output device interface, a sound card, speakers, and other subsystems, as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection, as shown. For example, through the network interface 1016, the processor 1002 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch sensitive displays, transducer card readers, tape readers, voice or handwriting recognizers, biometric readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to: all the media mentioned above, magnetic media such as hard disks, floppy disks, and magnetic tape, optical media such as CD-ROM disks, magneto-optical media such as optical disks, and specially configured hardware devices, such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized (e.g., server devices, appliances with hardware configured for specific functions, such as a web server or an application server, and/or various other types of computing devices that can execute various operating systems and/or virtual machine software techniques).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for authentication and authorization for a plurality of applications, comprising:
    a hardware processor configured to:
        send user credentials to a remote server to authenticate a user on a device for a plurality of applications;
        receive a device token from the remote server for persistent authentication of the user for the plurality of applications on the device, wherein the device token is persistently stored on the device for granting multiple instances of access to use one or more of the plurality of applications without a need for re-authentication by sending the user credentials from the user on a per client basis, wherein said persistent authentication is shared across the applications and enables remote revocation of authorizations by revoking the device token;
        send multiple access token requests to the remote server requesting the multiple instances of access without re-authenticating the user, wherein each access token request includes the device token and a respective client identifier uniquely identifying a respective application of the plurality of applications; and
        receive access tokens from the remote server granting the multiple instances of access to use one or more of the plurality of applications; and
    a memory coupled to the processor and configured to provide the processor with instructions.

2. The system recited in claim 1, wherein the device token is uniquely associated with the user to verify authentication, and wherein the device identifier is associated with a profile identifier to provide for the authorization for access to a resource.

3. The system recited in claim 1, wherein the device token is stored in persistent storage without an expiration.

4. The system recited in claim 1, wherein the device token is a persistent, non-transferable device token, and wherein the device token is uniquely associated with the user and with the device.

5. The system recited in claim 1, wherein the device token includes authorization information to authorize the user on the device to access a resource.

6. The system recited in claim 1, wherein the device token is associated with a device identifier (ID) that is uniquely associated with the device, and wherein the device token is associated with a user identifier (ID).

7. The system recited in claim 1, wherein the device token includes an authentication token.

8. The system recited in claim 1, wherein the device token includes an access token.

9. The system recited in claim 1, wherein the user authorization credentials are not stored locally on the device.

10. The system recited in claim 1, wherein the processor is further configured to:
    receive a deauthorization message from the remote server, wherein the deauthorization message invalidates the device token.

11. The system recited in claim 1, wherein the processor is further configured to:
    execute an application manager that communicates with the plurality of applications on the device to implement the device token based authentication and authorization, wherein the device token is uniquely associated with a user identifier and a device identifier to verify authentication, and wherein the device identifier is associated with a profile identifier to provide for the authorization for access to a resource.

12. A method for authentication and authorization for a plurality of applications, comprising:
    sending user credentials to a remote server to authenticate a user on a device for a plurality of applications;
    receiving a device token from the remote server for persistent authentication of the user for the plurality of applications on the device, wherein the device token is persistently stored on the device for granting multiple instances of access to use one or more of the plurality of applications without a need for re-authentication by sending the user credentials from the user on a per client basis, wherein said persistent authentication is shared across the applications and enables remote revocation of authorizations by revoking the device token;
    sending multiple access token requests to the remote server requesting the multiple instances of access without re-authenticating the user, wherein each access token request includes the device token and a respective client identifier uniquely identifying a respective application of the plurality of applications; and
    receiving access tokens from the remote server granting the multiple instances of access to use one or more of the plurality of applications.

13. The method of claim 12, wherein the device token uniquely associated with the user to verify authentication, and wherein the device identifier is associated with a profile identifier to provide for the authorization for access to a resource.

14. The method of claim 12, further comprising:
    receiving a deauthorization message from the remote server, wherein the deauthorization message invalidates the device token.

* * * * *